July 1, 1941. C. D. PETERSON ET AL 2,247,714
TRANSMISSION MECHANISM
Filed June 24, 1939 6 Sheets-Sheet 6
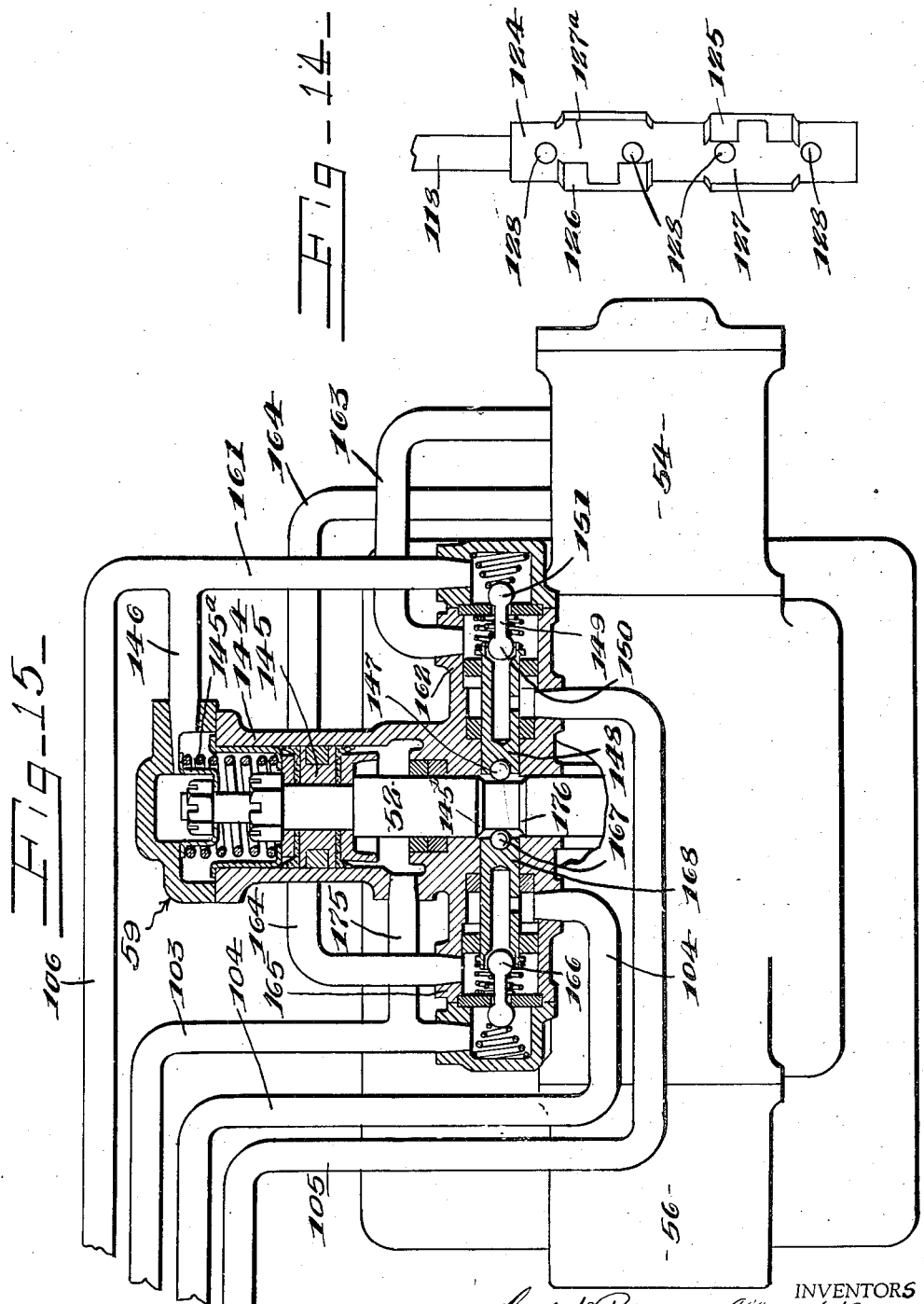
INVENTORS
Carl D. Peterson + Albert H. Deimel
BY
Bodell & Thompson
ATTORNEYS.

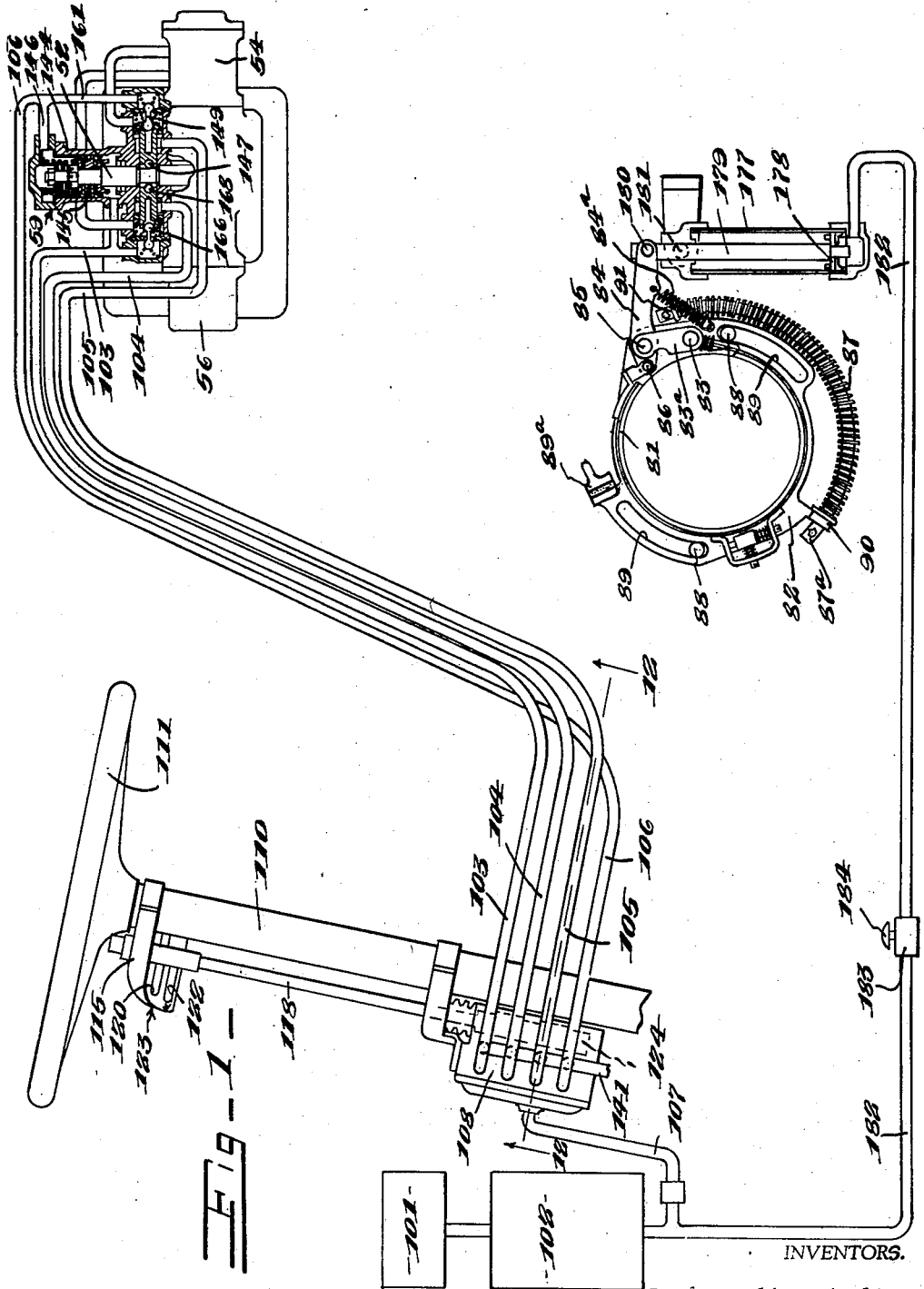

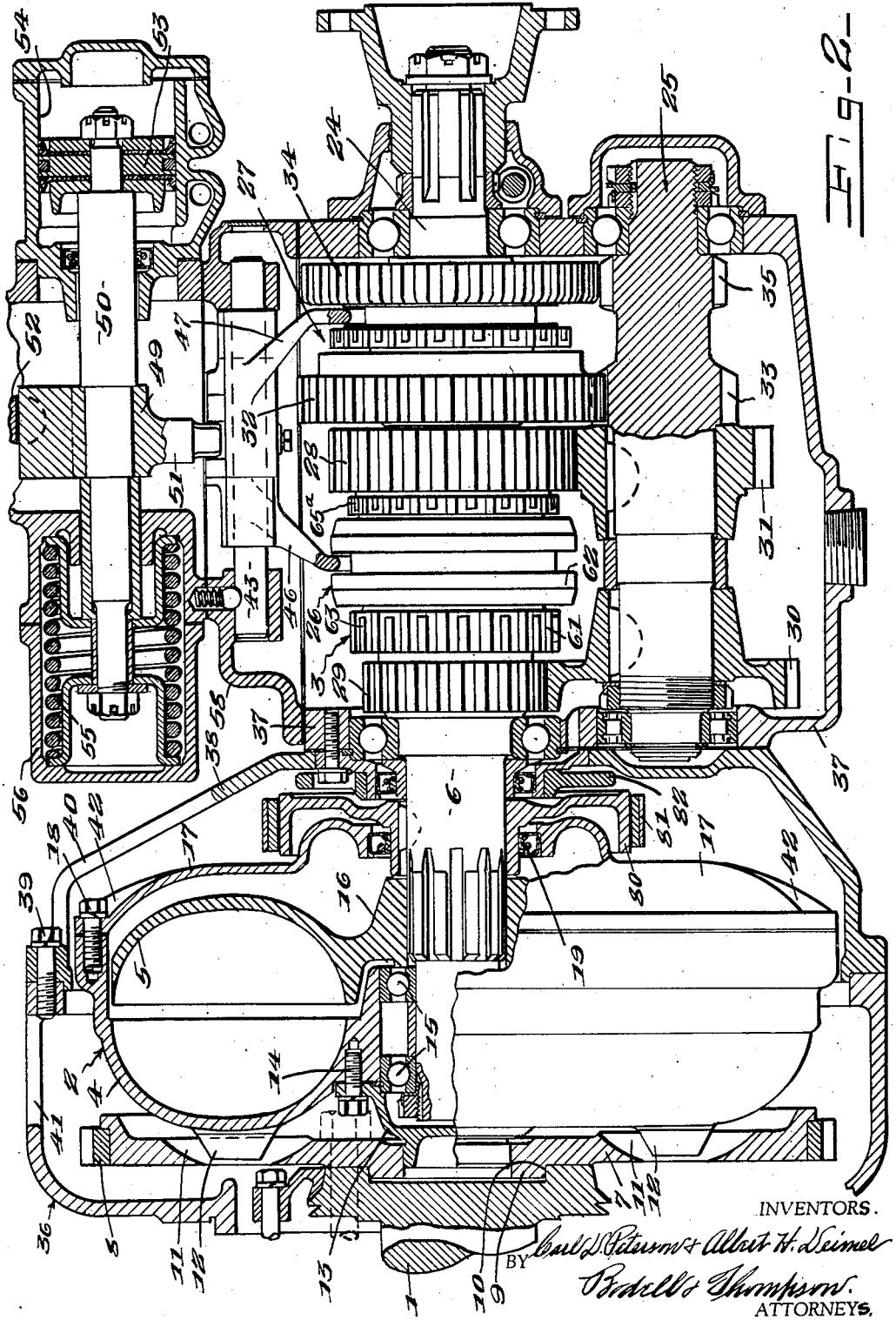

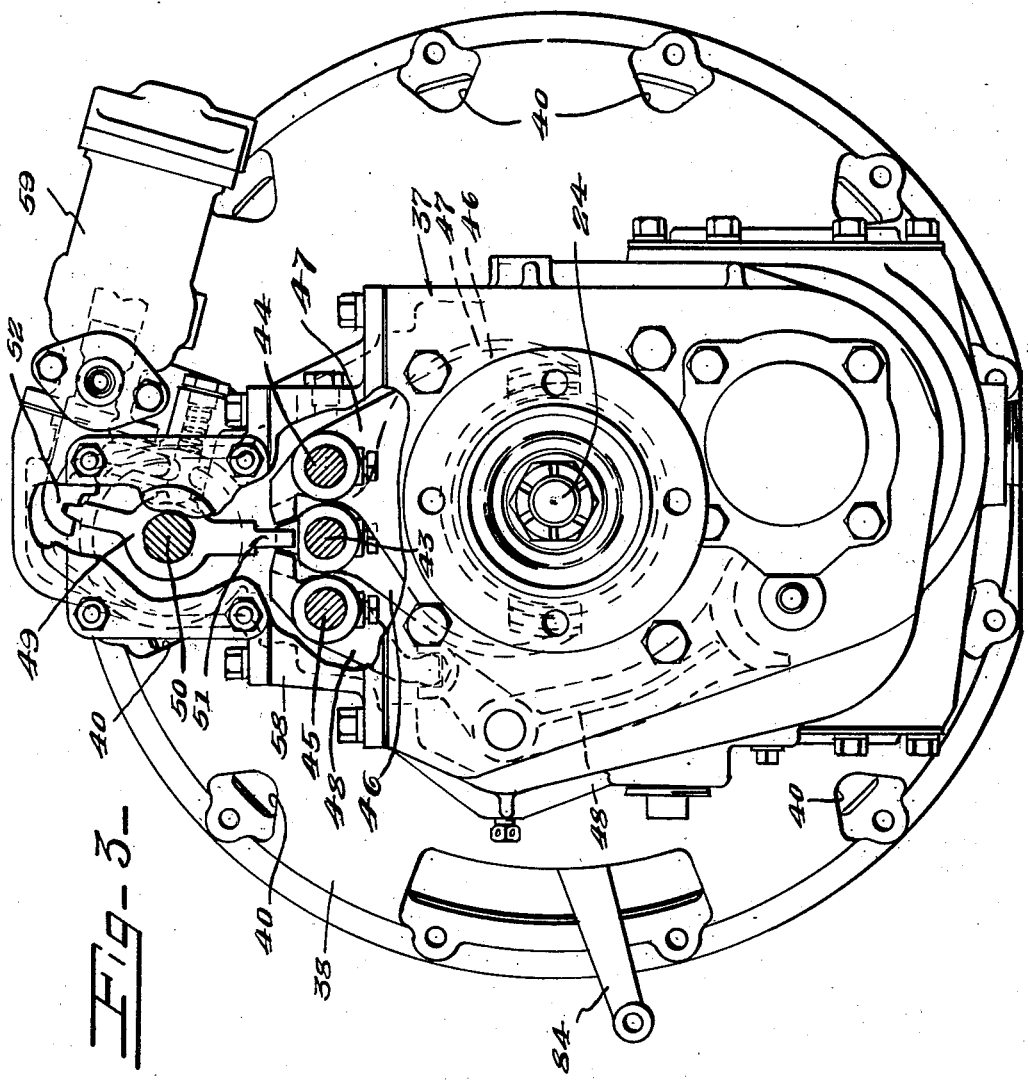

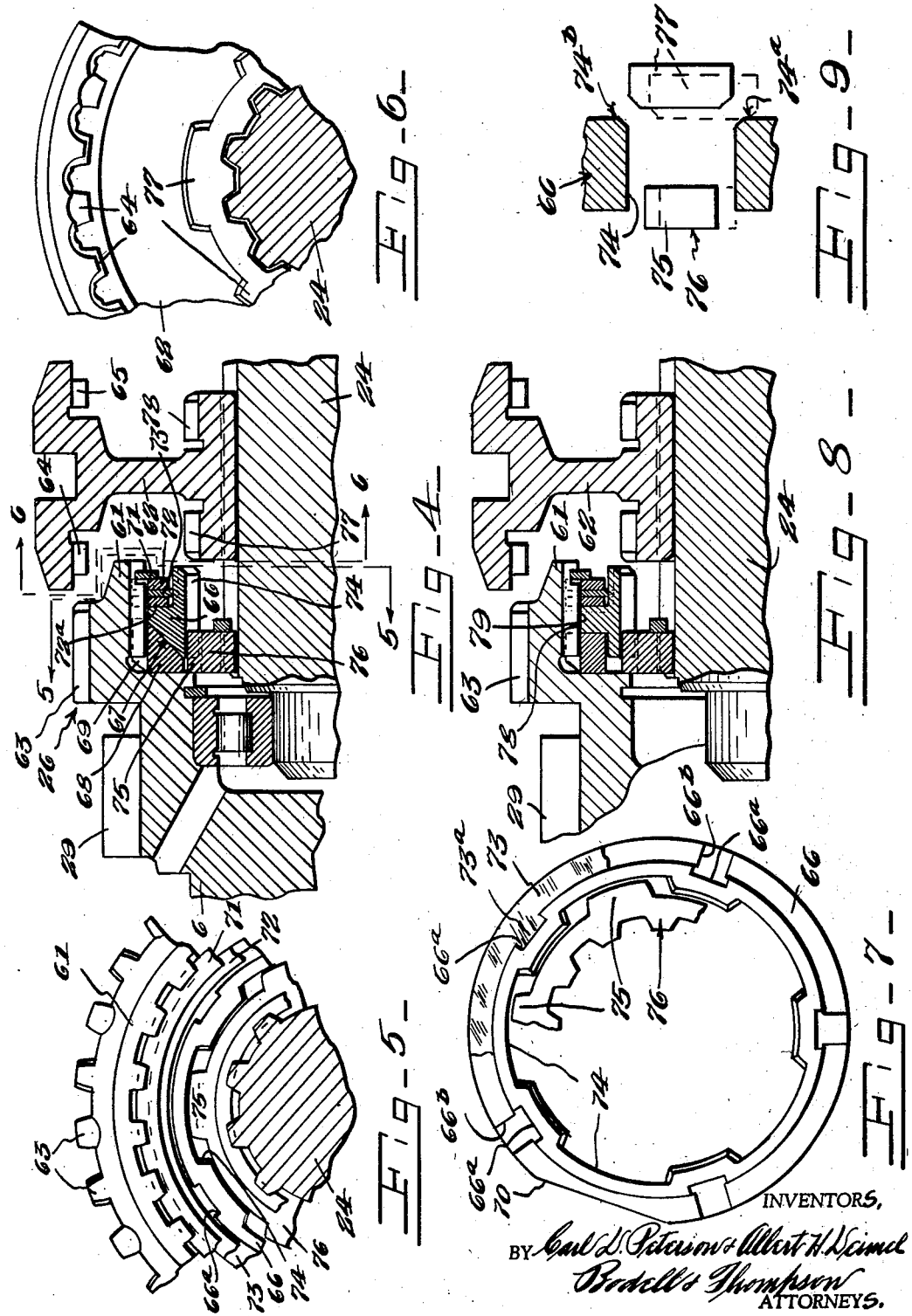

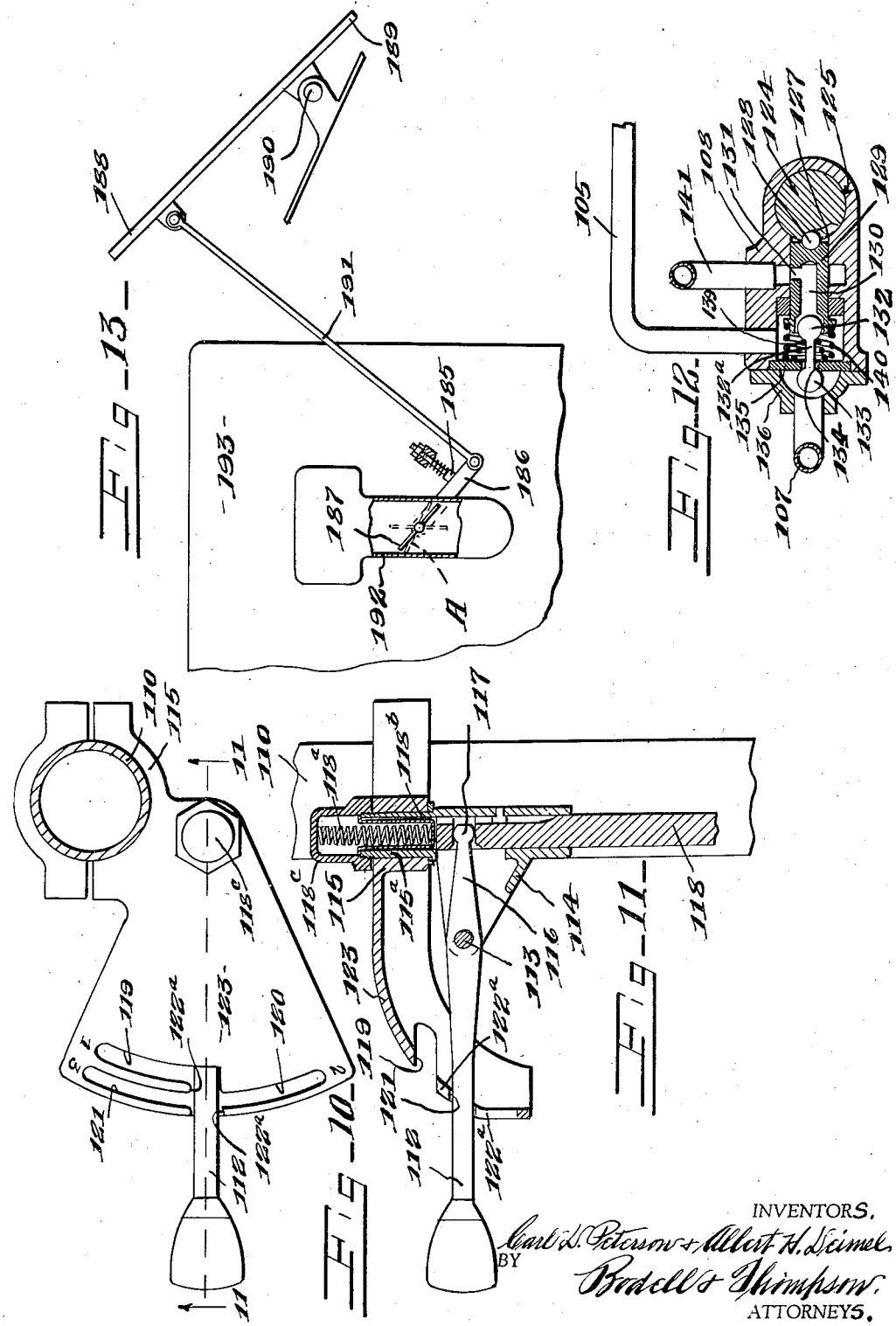

Patented July 1, 1941

2,247,714

UNITED STATES PATENT OFFICE 2,247,714

TRANSMISSION MECHANISM

Carl D. Peterson and Albert H. Deimel, Toledo, Ohio

Application June 24, 1939, Serial No. 281,014

2 Claims. (Cl. 74—189.5)

This invention has for its object a transmission mechanism which embodies a hydraulic or fluid coupling and a change-speed transmission gearing, which gearing includes selectively operable shiftable clutch members, and means for balking or blocking the engagement of the clutch teeth until the speeds of the driving and driven members of the clutch cross, and also means for causing the speeds to cross under certain conditions.

It further has for its object a transmission mechanism embodying a hydraulic or fluid coupling, and a change-speed transmission gearing in which the power means is a fluid pressure system including a source of fluid under pressure, branch conduits connected to fluid motor means which operates to shift the shiftable clutch members, another branch conduit with a fluid motor therein which operates the brake which effects the crossing of the speeds, an operator-operated or hand operated member or lever operable to first select the valve in the branch conduit connected through a pressure-operated clutch selecting means to the fluid motor for a given gear shift and then to open said valve while the unselected valves remain closed, and an operator-operated valve in the branch conduit leading to the fluid motor which operates the brake.

It further has for its object in such a transmission mechanism embodying a hydraulic or fluid coupling and a change-speed transmission gearing embodying balking ring clutches, means for decelerating rapidly the speed of the driving member of the clutch, usually by quickly decelerating the engine to effect a quick crossing of the speeds, and hence a quick speed shift.

Other features will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view of the transmission system and controls therefor.

Figure 2 is a longitudinal sectional view through one form of transmission mechanism embodying the invention.

Figure 3 is an end view looking to the left in Figure 1.

Figures 4, 5 and 6 are fragmentary detail views of one form of balking ring type of clutch embodied in the transmission mechanism, Figure 4 being a fragmentary longitudinal sectional view; Figures 5 and 6, fragmentary sectional views taken respectively on lines 5—5 and 6—6, Figure 4.

Figure 7 is an elevation or face view of the balking ring of the clutch shown in Figures 4, 5 and 6.

Figure 8 is a sectional view, similar to Figure 4, of a similar balking ring clutch but embodying a slightly different form of balking ring.

Figure 9 is a developed operation view of the balking ring clutch.

Figures 10 and 11 are detail views of the hand control of the selecting and shifting mechanism, Figure 10 being a plan view, and Figure 11 a sectional view on line 11—11, Figure 10.

Figure 12 is a sectional view taken approximately on the plane of line 12—12, Figure 1.

Figure 13 is a fragmentary view illustrating the engine accelerator control for rapidly decelerating the engine under certain conditions.

Figure 14 is a detail view of the manually operable selector member or cam.

Figure 15 is a sectional view through the power-operated selector motor and valve arrangement.

The transmission comprises a hydraulic or fluid coupling, a change-speed transmission gearing embodying so-called synchro-lock jaw clutches, that is, balking ring clutches, a brake operable, under certain conditions, to effect the crossing of the speeds, a power system to select and operate the shiftable clutches of the transmission gearing and also to operate the unlocking brake, an operator-operated control, as a hand lever having a selecting and shifting movement to control the selecting and shifting by the power system, and also an operator-operated control for the operation of the brake by power.

In Figure 2, 1 designates the drive or engine shaft. 2 designates the hydraulic coupling, and 3 the transmission gearing. The hydraulic coupling includes a driving or impeller element 4, a driven or runner element 5 mounted to rotate respectively with the shaft 1, and the input shaft 6 of the transmission gearing.

The engine shaft 1 is formed with an annular head or wheel 7 thereon, this being shown as provided with a peripheral ring gear 8 by means of which the engine may be started or cranked in the usual manner. The head or wheel 7 is shown as having a hub 9 set into an axial socket or bore 10 in the end of the shaft 1, and as itself being provided with a central recess.

The driving or impeller element 4 of the hydraulic coupling is assembled to the wheel 7 by an axial movement, and one of these two parts, usually the wheel 7, is provided with an annular series of radial notches 11 for receiving an annular series of driving lugs 12 provided on the outer or front face of the impeller element 4. The impeller element also has an axial bearing member 13 journalled in the recess 10 at the center of the wheel 7, this being in the form of a cap secured to the pump element 2, as by screws 14. The impeller element 4, as shown in Figure 2, also is mounted on the end of the input shaft 6 to rotate about the same, by suitable anti-friction bearings 15. The driven element or runner 5 has a hub 16 splined on the input shaft of the transmission gearing. The driving or impeller element 4 has also a discoidal back plate 17 secured at its outer margins thereto, as by screws 18 and provided with a central opening concentric with the shaft 6, this opening being provided with an oil seal 19. This central opening is around the hub of a brake drum to be presently described.

The transmission gearing shown in Figure 2, in addition to the input shaft 6, includes an output shaft 24 axially alined with the input shaft, and a counter shaft 25, and trains of gears between the input and the output shafts. It also includes one or more selectively operable clutches for clutching different gear trains into operative position. 26 and 27 designate generally the clutches. When the clutch 26 is shifted to the left from neutral position, it clutches the input shaft 6 and output shaft 24 directly together in direct drive relation. When it is shifted to the right from neutral, it clutches the gear 28 to the output shaft 24, so that the drive is through a train of gears as follows: Gear 29 on the input shaft 6, gear 30 on the counter shaft, gear 31 on the counter shaft and the gear 28 with which it meshes.

When the clutch 27 is shifted to the left (Figure 2), it clutches gear 32 to the output shaft 24, so that the output shaft is driven through a train of gears 29, 30, the countershaft gear 33 on the countershaft and the gear 32 with which it meshes.

Reverse speed is obtained by shifting an idler, not shown, into mesh with the gears 35, 34. As the reverse mechanism is not a feature of the invention, and as any well-known arrangement of reverse through an idler may be used, description thereof is thought to be unnecessary.

The hydraulic coupling 2 is enclosed in a suitable housing 36 fixed to the engine crank case. The transmission gear is mounted in a suitable gear box 37, and a bell housing 38 extends between the front end of the gear box and the rear end of the housing 36 and is detachably secured, as by screws 39, to the rear edge of the gear housing 36. The input shaft 6 extends into the bell housing, and the whole arrangement is such that the hydraulic coupling and transmission gear are closely coupled in a unit.

A brake mechanism for effecting the crossing of the speeds is located, in the construction shown in Figure 2, in the bell housing 38 in the rear of the back plate 17 of the impeller element 4 of the hydraulic coupling. For the purpose of cooling and ventilating the coupling, the bell housing and the housing 36 are formed with inlet and outlet ventilating openings 40 and 41 respectively, which may be suitably screened, if desired. Also, the back plate 17 is formed with ribs or vanes 42 for facilitating the circulation of the air and the cooling of the coupling.

The clutches 26 and 27 may be selected and shifted by any well-known type of mechanism embodied in the gear box. The shifting mechanism here shown consists of three axially movable shift rods 43, 44 and 45 having blocks thereon carrying forks 46, 47 and 48 for shifting the clutches 26, 27. These shift rods are selected by means of a block 49 mounted on an axially shiftable shaft 50 and having a finger 51 selectively movable into notches in the blocks on the shift rods, these notches being in alinement when all clutches are in neutral position. The rod 50 is also movable axially to shift the selected rod 43, 44 or 45. The block 49 is rocked by a transversely movable, power-operated selector 52 (Figures 1, 2, 3 and 15). The rod or shaft 50 is here shown as shiftable axially, as by power means including a fluid operated motor, as a piston 53 mounted on one end of the shaft 50 and movable in the cylinder 54. The axial movement of the shaft 50 and the piston 53, under power in either direction from central or neutral position, is against the action of returning spring 55 acting on the other end of the shaft and located within a cylinder 56. The shift rods are located in a cover 58 for the gear box, and the cylinder and housing for the selecting and shifting rod 50 are mounted on the cover 58. The pistons are actuated by a pressure fluid, as air, and the control of the flow of said fluid is effected through valve mechanism located in a housing 59 (Figure 3). The valve mechanism within the housing 59 and the selector 52 are operated by a fluid motor in the power system, controlled by an operator-operated selector.

The clutches 26 and 27 are of the balking ring type, wherein when being shifted, complete shifting is balked or blocked until the speeds cross.

One construction of balking ring clutch is shown in Figures 4, 5 and 6. 61 (Figures 2 and 4) designates the driving toothed member of the clutch 26; 62 the driven clutch member, these having respectively teeth or jaws 63, 64 operable into interlocking or clutching engagement by the axial shifting of one of the clutch members, here shown as the clutch member 62. The member 62 is splined on and shiftable axially of the output shaft 24 and is shiftable in opposite directions from neutral to effect direct drive and indirect drive, as before explained. Being of double construction, the clutch member 62 is provided on one side with the teeth 64 and on the other side with similar set of teeth 65. For facilitating engagement of the clutch teeth, or jaws 63, 64, the teeth of each set are alternately long and short and the long teeth chamfered.

66 (Figures 4 and 7) designates the balking ring having a friction face, as a conical face 67, coacting with a complemental conical face on a ring 68 interlocked with, as by splines 69, the driving member 61 of the clutch, so as to rotate therewith. The conical face of the balking ring is engaged with light friction with the complemental face of the ring 68. As here shown, the balking ring 66 is eccentrically weighted, and has a slight radial throw sufficient to press the heavier side thereof against the ring 68 under the action of the centrifugal force, and thus create a slight frictional drag of the balking ring 66 on the ring 68 in order to rock the balking ring or more it circumferentially, within limits, into and out of locking or blocking position. It is here shown as eccentrically weighted by removing a side rim portion at 70 (Figure 7). The balking ring is held assembled with the clutch member 61 by a lock ring 71 and rings 72, 72ª and 73 interposed between the locking ring and the balking ring. The rings 72, 72ª are interlocked with the clutch member 61 and rotate therewith, and the ring 73 is interposed between the rings 72, 72ª and interlocked with the balking ring 66, it being provided with internal lugs 73ª extending into recesses 66ª in the balking ring. The portions 66ᵇ (Figure 7) of these recesses are merely incidental to the forming of the recesses 66ª. These rings 72, 72ª and 73 serve to initially thrust the balking ring 66 into light frictional engagement with the ring 68 to cause it to drag on the ring 66 and hence to rock in its locking and unlocking movement, until the centrifugal force is built up on the ring 66 and the dragging effect increased thereby in accordance with the speed. One of these rings, as 73, may be in the nature of a spring or wave washer. The rings 72, 72ª and 73 are located in an annular recess in the balking ring 66. The balking ring is formed with internal recesses 74 which receive radial projections 75 on a ring 76 splined to the output shaft 24. The projections 75 are of less width than the recesses 74 to permit a rotary movement, within limits, of the balking ring 66 relatively to the ring 76 and the shaft 24. The clutch section 62 is provided with radial projections 77 and 78 on opposite sides thereof. These projections 77, 78 are of the same width as the recesses 74 and are free to pass through the recesses 74 when alined therewith, in order to permit shifting of the clutch section 62 to carry the clutch teeth 64 thereof into interlocking engagement with the clutch teeth 63 of the driving clutch section 61, but to block or balk such shifting when out of alinement therewith. The balking ring is rocked to carry the recesses 74 out of alinement with the teeth 77, so that the ends of the teeth 77 engage, as at 74ª or 74ᵇ (Figure 9) on the ring 66, when the driving and driven members are rotating at different speeds at the time the shift is initiated. This is due to the drag of the balking ring under light pressure on the friction face of the ring 68, due to the eccentric weighting thereof. When, however, the speeds cross, the same drag moves recesses 74 into alinement with the teeth 77, and hence with continued shifting pressure being applied, the teeth 77 can pass into the recesses 74 and bring the clutch teeth 64 into interlocking engagement with the clutch teeth 63. When the shift is made to the right from neutral, the clutch teeth 65 are brought into engagement with complemental clutch teeth 65ª on the gear 28, which is now the driving member of the clutch, and a similar balking ring controls the blocking of the teeth 77.

The term "crossing of the speeds" or similar expression is used for brevity's sake. In the balking ring type of clutch, the crossing of the speeds is effected when the driving clutch member is accelerated up to and beyond the speed of the driven clutch member, when both are rotating, or the driven clutch member accelerated up to and beyond the speed of the driving clutch member, as when the vehicle is coasting, or decelerating the speed, so that the driving clutch member decreases in speed to and beyond that of the driven clutch member, or when the driven clutch member is stationary and the driving clutch member rotating and its rotation reversed momentarily.

The clutch 27 is of similar construction or of the construction shown in Figure 8, and when this clutch is used, either the gear 32 or the gear 34 is the driving member of the clutch, in accordance with the direction the clutch 27 is shifted from neutral. In the clutch shown in Figure 8, the balking ring is eccentrically weighted, as in Figure 7, but is provided with a cylindrical peripheral face 78 instead of a conical face, as in Figure 4. The cylindrical face frictionally engages with light frictional engagement the end or top faces 79 of the internal teeth or splines on the clutch member or section 61.

In starting from a stand-still, when the output shaft 24 is stationary, the clutch 27 is usually used and shifted into first gear forward, that is, the clutch 27 is shifted to the left (Figure 2) to clutch the gear 32 to the output shaft 24, although the start may be made through any other gear. The clutch 27 is of the same operation as the clutch 26. Shifting of the clutch 27 to the left from neutral, brings its projections 77 against the balking ring 66 into the position 74ᵇ (Figure 9), because the balking ring 66 has been moved into this position, due to the rotation of the driving gear 32 which corresponds to the driving gear 29 in Figure 5. The projection 77 is then in the dotted line position shown in Figure 9 where it remains until the speeds are crossed by the application of the brake to be presently described. When this brake is applied and the input shaft 2 rotated slightly in a reverse direction from its normal rotation, and consequently the gear 32 also so rotated, the projections 77 aline with the passages or recesses 74, permitting the clutch 27 to be shifted completely inward to engage the teeth 64 with the teeth 63.

When the vehicle is being started from a standing start with the impeller element for the hydraulic coupling in motion, the clutches 26 and 27 are in neutral, and the input shaft is being actuated idly by the runner element 5 of the hydraulic coupling, and hence the counter shaft 25 and the gears 28, 32 are being rotated idly. Hence, in order to make a shift, it is necessary to effect a relative motion of the stationary clutches and the shaft 6 or the driving member of the clutch, whichever it happens to be, whether the member 61 or the gear 28, 32 or 34, in order to effect the crossing of the speeds to permit the selected clutch to be fully operated. The means for effecting the crossing of the speeds under this condition, wherein the selected clutch is to be shifted from neutral, when the vehicle is stationary, or the speed of the transmission shaft of the gearing is zero, comprises brake means operable to successively stop the rotation of the input shaft 6 and the driving clutch members being rotated idly thereby, and then actuate the same in a reverse direction.

The brake means consists of a brake part, here shown as a drum 80 rotatable with or keyed to the input shaft, in order to rotate with the driven or runner member of the hydraulic coupling, a second part here shown as a brake band 81 encircling the brake drum 80, carrier 82 rotatable about the axis of the brake band, a certain amount, within limits, the brake band being anchored at one end at 83, an operating lever 84 pivoted at 85 to the carrier and having an arm pivoted or anchored at 86 to the other end of the brake band. The rocking movement of the carrier 82 is yieldingly restrained by a spring 87, and the rocking movement of the carrier 82 limited in any suitable manner, as by a stop or pin 88 extending into an arcuate slot 89 in the carrier 82. The pin 88 is carried by any part adjacent the brake, as the parts 37 and 38 (Figure 2). The anchoring point at 83 at one end of the brake is at one end of a link 83ª, the other end of which link is here shown as mounted on the pivot 85 of the operating lever 84. Also, a spring, as a tension spring 84ª, is connected at its opposite ends to the outer arm of the lever 84 and to the carrier and tends to return the operating lever to its starting position or return it into its initial relation to the carrier 82.

The spring 87 is interposed between a spring abutment 90 on the carrier 82 and a fixed abutment 91 on the adjacent wall of the housing or any other convenient part, as the parts 37 and 38 (Figure 2).

The valve mechanism in the casing 59 operates the selector 52 to rock the block 49 to cause the finger 51 (Figure 3) to select one of the shift rods 43, 44, 45 and also controls the flow of air to the cylinder 54 to one side or the other, as the case may be, of the piston 53 to actuate the selected shift rod 43, 44 or 45 in the correct direction. Normally, the central shift rod 43, which controls second and third speed, is engaged with the finger 51 of the selector 49 on the shaft or rod 50, and hence initially, if the speed selected is one controlled by the central shift rod 43 and the hand lever 112 in central position, the cam 124 is in position to operate the valve in the casing 108 controlling the conduit 105 and hence fore or aft movement of the hand lever 112 in one direction, as will be explained, causes the air under pressure to enter one end or the other of the cylinder 54 and actuate the piston 53 in one direction or the other, in accordance with the fore or aft direction of movement of the lever 112.

Upon operation of the lever 84, as upwardly in Figure 1, the lever 84 moves on its pivot 85 to contract the brake band 81 on the drum 80, and hence grip the brake drum, and then during further movement rocks the carrier 82 against the spring 87, causing the brake drum to be rocked, and in so doing, rocking the input shaft 6. The rocking movement is determined by the length of the slot 89. This operation successively applies the brake band to grip the brake drum and after stopping the drum rocks it in the reverse direction, and hence rocks the input shaft 6, to cause the speeds to cross, particularly when the vehicle is stationary or the speed of the transmission shaft in the gear box is zero. By causing the speeds to cross under these conditions, the balking ring is rocked to unlocked position to permit engagement of the jaw faces of any two clutch sections to be brought together. The spring 87 is mounted concentrically with the axis of the carrier, and for this purpose is mounted on an arcuate guide rod 87ª.

The return movement of the brake band 81, lever 84, and associated parts, is under the influence of the spring 87, and hence overthrow of the brake band during its return movement is limited by a suitable fixed buffer 89ª. The spring 84ª is weaker than the spring 87, and hence, when the lever 84 is actuated by the piston 178, it first moves on its pivot 85 and applies the brake band to the brake drum to stop the rotation of the input shaft 6 and when the shaft 6 is stopped from rotation, the brake band is rocked under the force applied by the piston 178 to the lever 84 and rocks the input shaft 6 in a reverse direction. The leverage is such that as long as the shaft 6 and the brake are rotating, the sliding torque of the brake is greater than and overcomes the reverse rocking or rotating torque of the arm 84, until the shaft 6 is stopped. The amount of rocking movement of the brake band is that of the balking ring of the clutch times the greatest gear ratio reduction controlled by the balking ring clutch, for instance, the balking ring 66 would have a rocking movement from locked position to unlocked position equal to the distance (Figure 9) between a wall of the passage 74 and the opposing wall of the projection 75 and the brake has a rocking movement sufficient to effect this rocking movement of the balking ring through the greatest gear ratio reduction of the transmission gearing. The reverse movement of the brake must be sufficient to move the balking ring of the clutch effecting low speed through the greatest reduction ratio a distance equal to that just pointed out, between one wall of the passage 74 and the opposing wall of the projection 75 when the passage 74 is alined with the teeth or projection 77.

The power control system comprises a source of fluid pressure, as compressed air, valve controlled branch conduits leading from said source to a selector, fluid-operated motor, valves to bypass the pressure fluid to another fluid motor, as the piston and cylinder 53, 54 (Figure 2) for operating the selected shift rod, and an operator-operated member or hand lever having a selecting movement to select the valve in the particular conduit to be opened, and the shifting movement to open the valve in the selected conduit, an additional branch conduit having an operator-operated valve therein, the additional conduit being connected to a fluid-operated motor which actuates the operating lever 84 of the brake operable to effect crossing of or facilitating the crossing of the speeds 101 designates an air compressor which communicates with a storage tank 102, these constituting one source of pressure fluid for effecting the selecting and shifting of the clutches in the gear box and for operating the brake lever 84.

103, 104, 105 and 106 designate branch conduits supplied through a pipe 107 from the reservoir 102 through the valve casing 108. These branch conduits lead to the casing 59 mounted on or associated with the gear box and containing the valve mechanism, which effects the selecting of the clutch to be shifted and the shifting of the clutch. In the valve casing 108 are valves individual to the branch conduits 103, 104, 105 and 106. The valves in the casing 108 may be of any suitable size and construction. It is merely necessary for an understanding of the system forming part of this invention to bear in mind that the valves are individual to the conduits 103, 104, 105 and 106 and are selectively operable. They are, in effect, two-way valves normally arranged in position to prevent passage of air through the conduit from the reservoir 102 but to permit air to exhaust therefrom.

The operator-operated member or hand lever is here shown as mounted on the steering column 110 of the vehicle beneath the hand steering wheel 111. 112 designates the hand lever pivoted at 113 to a bracket 114 supported by a second bracket or plate 115 fixed to the column 110. The bracket 114 is rotatably mounted in the bracket or plate 115 and held from endwise or axial movement therein. The hand lever 112 has an arm 116 pivoted as by a ball-and-socket joint at 117 to a rod or shaft 118 extending parallel to the column 110 and slidable endwise relatively to the bracket 114 but movable therewith about the rocking axis of the bracket 114 when it is rocked by the lever 112. The movement of the lever 112 about the pivot 113 is a selecting movement. The lever also has a fore and aft movement along the guide slots 119, 120, 121 and 122 formed in a quadrant 123 which is a fixed part of the bracket 115, the slots being connected by a cross-over or neutral slot 122ª. The lower end of the rod 118 extends into the valve casing 108 which is carried also by the steering column, and has cams 124 for operating the valves which control the conduits 103, 104, 105 and 106. The selecting movement of the lever 112 through the cross-over or neutral slot 122ª moves the lever 112 on its pivot 113 and hence moves the rod end endwise upwardly or downwardly, and in so doing, causes a cam to select the valve in one of the conduits 103, 104, 105, 106, and then the movement of the lever fore or aft along one of the slots 119, 120, 121, or 122 rocks the rod 118 about its lengthwise axis which is also the rocking axis of the bracket 114, causing the cam 124 to open the selected valve, permitting air to pass from the compressor through the pipe 107 and the selected conduit 103, 104, 105 or 106 to the valve casing 59 in the gear box.

The cam 124 within the valve casing 108, as seen in Figure 14, is provided with raised portions 125 and 126 formed with depressions 127 and 127ª therein, the opposite side walls of which constitute lift portions arranged to act upon balls, as the ball 128 (Figure 12), each of which balls thrust against a plunger 129 (Figure 12) slidable in the valve casing 108 and having a lengthwise passage 130 therethrough opening through the end of the plunger remote from the ball 128, and also having a laterally extending port 131. The open end of the passage 130 is provided with a valve seat with which coacts an exhaust valve head 132 of what in effect is a two-way valve 132ª. The head 132 is connected to an intake valve head 133 to move in unison therewith. The intake valve head 133 controls an intake port 134 in a wall or partition 135 between a header 136 of the valve casing 108 and the body of the valve casing 108. The combined intake and exhaust or two-way valve is here shown as in the general form of balls connected by a bar or in the general form of a dumb-bell. A spring 139 acts on each combined intake and exhaust valve 132ª and tends to close the intake valve 133. When the intake valve 133 is closed, the exhaust valve head 132 is open. An additional spring 140 acts on the slide 129 and tends to press the ball 128 against the cam 124. The port 131 of the plunger or slide 129 communicates with an exhaust pipe 141. There is a valve mechanism including a plunger 129, a combined intake and exhaust valve 132ª for each conduit 103, 104, 105 and 106.

The specific valve construction, particularly in regard to the dumb-bell shaped valve forms no part of this invention, and in so far as this invention is concerned, these valves are merely two-way valves and any suitable two-way valve may be substituted therefor.

Upon the selecting movement of the hand lever 112, the cam 124 is shifted endwise, so that the ball 128 of the selected valve is in position to be lifted by the cam 124, when the hand lever is rocked fore or aft, and upon such rocking, the ball 128 is moved, as to the left (Figure 1) sliding the plunger 129 to move the exhaust port 131 out of alinement with the exhaust pipe 141, press the seat for the exhaust valve head 142 against the exhaust valve head, and move the combined intake and exhaust valve from the left, thus opening the intake valve 133 so that the air then flows through the conduit 107 into the header 136 past the selected open intake valve head 133 and through the selected conduit 103, 104, 105 or 106 to the power selector valve casing 59, and thence to the cylinder 54 to actuate the piston 53 in one direction or the other. As all other valves in the casing 108 are in starting position, or the position shown in Figure 12, the air in any unselected conduits 103, 104, 105 or 106 is free to exhaust back through the valve casing, passage 130, port 131 and exhaust pipe 141, or, in other words, when the piston 53 is moving in one direction, under the influence of air pressure on one side thereof, the air on the other side of the piston is free to pass out of the same through one of the unselected conduits.

The operation of the lever 112 about its pivot 113 to select the valve in the casing 108 that controls reverse gear moves the rod or shaft 118 upwardly against the retarding action of a spring 118ª interposed between an abutment 118ᵇ which coacts with the end of the rod or shaft 118 and a thimble 118ᶜ threading on the outer end of a bushing 115ª in the quadrant 123. The abutment 118ᵇ has an annular flange at its upper end coacting with the upper edge of the bushing 115ª to limit the movement of the abutment 118ᵇ under the action of the spring 118ª in a position in which the spring is effective on the rod 118 only when the rod is shifted upwardly by the lever 112 beyond normal or neutral position in the reverse slot 122ª. Thus the spring 118ª which serves to prevent unintentional shifting into reverse gear is supported by the quadrant at the upper end of the rod or shaft 118.

The general form of the valve selector or cam 124 is shown in Figure 14 and the position of the balls 128 and the lift portions and depressions of the cam indicated.

The casing 59 for the power selector is formed with a piston chamber 144 in which moves a piston 145 mounted on a rod, which is the transversely movable selector 52 also shown in Figure 3, which has a notch coacting with a radial arm on the block 49. The selector 52 is also formed to operate control valves for a purpose to be presently described.

Assuming that the hand lever 112 is operated to effect first speed, the selecting movement positions the cam 124 to operate the valve in the casing 108 so that when the hand lever is rocked backwardly in slot 119, the valve in conduit 106 is opened so that air flows through said conduit 106 and through branch conduit 146 into the cylinder 144 on the upper side of the piston 145 (Figures 1 and 14) and actuates the piston 145 downwardly against the action of a spring 145ª, causing a lift surface 145ᵇ thereon to thrust against ball 147 and move the plunger 148 to the right, and to operate the two-way or combined intake and exhaust valve 149 to close the exhaust valve head 150 and open the intake valve head 151, so that now the air can pass from pipe 106 through the branch 161 in the valve casing 162, past the open intake valve 151 and through pipe 163 to the right hand end of the cylinder 54, and actuate the piston 53 therein to the right to effect the shifting of the clutch 27 to the left to produce first speed. The air on the other, or left hand, side of the piston 53 is free to exhaust through pipe 164 into valve casing 165, past the exhaust valve head 166 which is open, and out through pipe 104. During the shifting of the piston 145, the lift portion 145ᵇ also thrusts against ball 167 thrusting plunger 168 to the left, opening intake valve head of the combined intake and exhaust or two-way valve 166, so that communication is established between the pipe 164 and the pipe 103, which, because of the position of the valves in the valve casing 108, is free to exhaust through the pipe 141. The two-way valves in the casings 162 and 165 are generally the same construction as that in the casing 108 and shown in Figure 12.

Upon shifting of the lever 112 back to neutral, or to the cross-over slot, the cam 124 is rocked to permit the valve therein controlling the conduit 106 to close, and hence open it to the exhaust from the right hand end of the cylinder 54 and from the upper end of the cylinder 144, when the shifting lever is again actuated fore or aft. The piston 145 is then restored to neutral position by the spring 145ᵃ. Assuming that it is shifted forward into second speed slot 120, the valve in the casing 108 controlling conduit 104 is opened, permitting air to enter conduit 104 to power selector valve casing 165, and as the two-way or combined intake and exhaust valve 166 is then in the position shown in Figure 15, the air is free to flow from the valve casing 165 through pipe 164 to the left side of the piston 53 and actuate the piston, and hence the shaft 50, and the selected shift rod to the right (Figure 2). Now assuming that the shift is to be made to third speed forward, the hand shifting lever is moved from the second speed slot rearward into the third speed slot, and in so doing, the valve in the casing 108 controlling the third speed conduit 105 is opened by the cam 124, so that the air passes from the source through the valve casing 108, conduit 105 to power selector valve casing 162, past the combined intake and exhaust valve 149, which is in the position shown in Figure 15, whereby the exhaust valve head is open, thence through conduit 163 to the right hand side of the piston 53, and the air from the left hand side of the piston is free to exhaust through conduit 164, valve casing 165, past the two-way or combined intake and exhaust valve 166 and out through conduit 104, valve casing 108, and exhaust pipe 141. To shift into reverse, the operating lever 112 is shifted into the reverse speed slot 122, thus operating the valve in the casing 108 which controls the reverse conduit 103, permitting air to flow therethrough and through branch conduit 175 into the lower end of the power selector cylinder 144 and actuate the piston 145 upwardly, causing a lift surface 176, similar to the lift 145ᵇ to act on the balls 147 and 167 to thrust the plungers 148 and 168 outwardly, thus opening the intake valve head of the two-way or combined intake and exhaust valve 166 and closing the exhaust valve head thereof, and effecting the same operation of the two-way or combined intake and exhaust valve 149, so that the air can pass from pipe 103 through valve casing 165, pipe 164 to the left end of the cylinder 54 to actuate the piston 53 to the left. The air exhausts from the right end of the cylinder 54 through pipe 163, valve casing 162, past the intake valve head 151 of the combined intake and exhaust valve 149 through conduit 106, valve casing 108, and exhaust pipe 141. Movement of the piston 145 in one direction or the other, rocks the rocking member or block 49 to cause the finger 51 to select any one of the shift rods 43, 44, 45. After being actuated in either direction by air pressure, the piston 53 is returned to central position in the cylinder 54 by the spring 55.

The specific construction of the valves per se forms no part of this invention, and in so far as this invention is concerned, they are merely two-way valves forming part of a transfer mechanism operated by a pressure-operated motor, as the cylinder and piston 144, 145 to transfer and by-pass the air under pressure from either side of the piston 53 which effects the shifting and the outlet of air from the other side. This operation takes place when the piston 145 is operated to select the shift rod to be shifted preliminary to the shifting of said rod by the piston 53.

The operating lever 84 for the brake utilized for effecting the crossing of the speeds, when the speed of the driven member of the balking ring clutches in the gear box is zero, is actuated by a fluid-pressure motor, here shown as a cylinder 177 and a piston 178 movable therein having its rod 179 pivoted at 180 to the operating lever 84. The cylinder is here shown as capable of oscillating and as pivoted at any suitable fixed point at 181. The fluid pressure or compressed air is supplied to the cylinder through a conduit 182 in communication with the storage tank 102. This has a normally closed two-way operator-operated valve 183 therein, the valve being opened by an operating member 184 preferably of the push-button type and located to be operated by the foot of the driver. The valve 183, when closing the conduit 182 to the flow of air to the cylinder 177, opens to exhaust the section of the conduit between the valve 183 and the cylinder 177. The conduit 182 is flexible. Also, the other conduits, such as 103, 104, 105 and 106 may be flexible or have flexible portions.

Thus, the power system includes a source of supply, here shown as a compressor 101 and a storage tank 102, and conduits, as 103 to 106 inclusive, communicating with the source of supply through a selector valve mechanism connected in said conduit and operator controlled, as by the hand lever 112, fluid-pressure motor means, as the cylinder 54 and piston 53 for operating the selected shift rod and fluid-motor-operated selector including cylinder 144, piston 145 therein, and valves in casings 162 and 165, which automatically control the by-passing of fluid to and from the piston 54 from the conduits 103 to 106 inclusive so controlled by the hand lever 112; and also the additional conduit 182 with operator-operated valve 183 therein for controlling the flow of pressure fluid or compressed air to the cylinder 177 operating the brake which effects the crossing of the speeds, so that the balking ring clutch may engage, particularly when the speeds of the rotating parts of the gear box are zero.

All the parts of the power system are correlated to effect shifting of blocking out or balking ring type of clutches in the gear box. The brake may also be used as a brake to merely decelerate the speed of the input shaft of the gear box and thereby make a faster shift to a higher gear ratio possible.

For facilitating a rapid gear shift or the unlocking of the balking ring clutches preliminary to shifting to a higher speed, or for speeding up the shift into a higher gear ratio, means may be provided for closing the throttle valve of the engine beyond its normal idling position. This may be accomplished, as seen in Figure 13, by providing a yielding stop 185 arranged to stop the arm 186 on the shaft of the throttle valve 187 when it is in idling position, that is, in the position shown in full lines in Figure 13, and to yield upon operation of the accelerator pedal 188 in a retrograde direction beyond its normal or starting position. The position of the throttle valve, when so operated to closed position beyond normally idle position, is shown in dotted lines at A. This operation is effected by pressing with the heel of the foot on the heel portion 189 of the accelerator pedal 188, that is, the portion beyond or in the rear of the pivot 190 of the accelerator pedal. The accelerator pedal may be connected to the arm 186 in any suitable manner, as by a link 191.

192 designates the throat of the carburetor in which the throttle valve is located. 193 designates the engine block.

The general operation is as follows: Assuming the vehicle is being driven through one speed ratio, the engine drives the vehicle through the hydraulic coupling and the gear ratio in the gear box. To shift to another gear, the operator moves the hand lever 112 to the desired position in one of the forward speed slots 119, 120, 121, then lifts his foot from the accelerator pedal 188 momentarily, thus reversing the direction of the torque. This permits the jaws of the engaged jaw clutch 26 or 27 in the gear box to disengage and the jaws of the clutch 26 or 27 to be engaged in the new gear ratio, to attempt to engage. They are, however, prevented from engaging by the balking ring of the selected clutch until the speeds of the driving and driven sections of the selected clutch cross, thereby unlocking the balking ring and permitting the jaw or toothed faces of the sections of the selected clutch to inter-engage. On making a shift to a higher gear ratio, the crossing of the speeds is accomplished by slowing down the engine by relieving the throttle valve and on shifting to a lower speed, the engine is slowed down by relieving the throttle to permit the jaw clutches to disengage and then opening the throttle to again speed up the engine, and hence the driving section of the clutch 26 or 27 to be engaged in the new gear shift. The speeding up of the engine to the new gear ratio on the down shift effects the crossing of the speeds permitting the jaw or toothed clutch faces of the selected clutch 26 or 27 to inter-engage.

When the vehicle is at a stand-still, and hence the clutches 26, 27 at a stand-still, jaw clutch engagement can not take place by merely slowing down or speeding up the engine, as the speeds of the driving and driven sections of the clutches 26, 27 do not cross, and the balking rings therefor lock out engagement of the jaw faces of the clutches 26 or 27. To cross the speeds under conditions where the speed of the driven members of the clutches 26, 27 is zero, it is necessary to stop the section of the clutch 26, 27, which is coupled to the engine, through the hydraulic coupling (it being borne in mind that the engine is running) and rotate it backwards enough to effect the crossing of the speeds. This is the purpose of the unlocking brake operated by the lever 84 and the cylinder and piston 177, 178 controlled by the valve 183. Upon operating of the unlocking brake, when the vehicle is at a stand-still, and the engine idling, the runner or driven element 5 of the hydraulic coupling and the driving element 61 of the clutch 26 or the corresponding driving element of the clutch 27 are stopped and rotated backward sufficiently to unlock the balking ring 66.

In the transmission gearing here shown, reverse speed is not controlled through a balking ring clutch. When the reverse speed is of the ordinary sliding gear type, it may be necessary, in order to get into reverse, to apply the brake operated by the lever 84 before shifting, in order to bring the gears to rest, and to avoid clashing. The brake may also be operated by opening the valve 183 in the conduit 182 to slow down the engine when a shift is being made to a higher gear ratio, in order to speed up the shift by speeding up of the crossing of the speeds. Preferably, however, the speeding up of the crossing of the speeds is effected by operating the accelerator pedal 188 in a retrograde direction beyond starting position, in order to more fully close the throttle valve beyond normal idling position.

By this power mechanism or power system, all shifts and selection for the shifts, as well as the means for effecting the crossing of the speeds are power operated but operator controlled, and the only forces applied by the operator is that to operate the hand lever 112 to shift the selecting valve 124 or to operate the member 184 and valve 183.

The balking ring shown and described herein constitutes the subject matter of divisional application, Serial Number 310,302, filed December 21, 1939.

The mechanism for effecting the unlocking of the balking ring constitutes the subject matter of divisional application, Serial Number 329,160, filed April 11, 1940.

What we claim is:

1. In a transmission mechanism for motor vehicles, the combination of a hydraulic coupling including impeller and driven elements, a change speed transmission gearing embodying a plurality of jaw clutches, each including driving and driven members, one of which is shiftable into and out of engagement with the other, the clutches also embodying balking means for preventing engagement of the clutch members until the speeds cross, means including a brake operable to shift the balking means out of balking position preliminary to the shifting-in operation of the clutch members of one clutch when the vehicle and the driven clutch member are stationary, fluid operated motors for shifting the shiftable clutch members and for operating the brake, a power system including a source of fluid, branch conduits leading therefrom to the fluid operated motors and having operator operated control valves therein, and an operator operated selector for selectively operating the valves in the branch conduits to the motor which effects the shifting of the shiftable clutch member, the valve in the branch conduit to the motor for the brake being operable independently of the valves in the other branch conduit.

2. In a transmission mechanism for motor vehicles, the combination of a hydraulic coupling including impeller and driven elements, a change speed transmission gearing embodying a plurality of jaw clutches, each including driving and driven members, one of which is shiftable into and out of engagement with the other, the clutches also embodying balking means for preventing engagement of the clutch members until the speeds cross, means including a brake operable to shift the balking means out of balking position preliminary to the shifting-in operation of the clutch members of one clutch when the vehicle and the driven clutch member are stationary, fluid operated motors for shifting the shiftable clutch members and for operating the brake, a power system including a source of fluid, branch conduits leading therefrom to the fluid operated motors and having operator operated control valves therein, and an operator operated selector for selectively operating the valves in the branch conduits to the motor which effects the shifting of the shiftable clutch member, the valve in the branch conduit to the motor for the brake being operable independently of the valves in the other branch conduit, the driving member of each jaw clutch being rotatable with the driven element of the coupling and the brake means being operable on the driven element of the coupling to shift the balking means to unlocked position.

CARL D. PETERSON.
ALBERT H. DEIMEL.